US011300294B2

(12) United States Patent
Kumagai et al.

(10) Patent No.: US 11,300,294 B2
(45) Date of Patent: Apr. 12, 2022

(54) GAS TURBINE COMBUSTOR

(71) Applicant: Mitsubishi Power, Ltd., Yokohama (JP)

(72) Inventors: Satoshi Kumagai, Yokohama (JP); Yoshihide Wadayama, Yokohama (JP); Keisuke Miura, Yokohama (JP)

(73) Assignee: Mitsubishi Power, Ltd., Yokohama (JP)

( * ) Notice: Subject to any disclaimer, the term of this patent is extended or adjusted under 35 U.S.C. 154(b) by 456 days.

(21) Appl. No.: 15/817,813

(22) Filed: Nov. 20, 2017

(65) Prior Publication Data

US 2018/0142893 A1 May 24, 2018

(30) Foreign Application Priority Data

Nov. 21, 2016 (JP) .............................. JP2016-225591

(51) Int. Cl.
 *F23R 3/28* (2006.01)
 *F02C 3/04* (2006.01)

(52) U.S. Cl.
 CPC .............. *F23R 3/283* (2013.01); *F23R 3/286* (2013.01); *F02C 3/04* (2013.01); *F05D 2220/32* (2013.01);
 (Continued)

(58) Field of Classification Search
 None
 See application file for complete search history.

(56) References Cited

U.S. PATENT DOCUMENTS

| 3,980,233 A | 9/1976 | Simmons et al. |
| 2004/0124273 A1* | 7/2004 | Koss ....................... F23R 3/283 239/533.2 |

(Continued)

FOREIGN PATENT DOCUMENTS

| CN | 102235673 A | 11/2011 |
| CN | 102383996 A | 3/2012 |

(Continued)

OTHER PUBLICATIONS

Korean-language Office Action issued in counterpart Korean Application No. 10-2017-0152989 dated Sep. 20, 2019 with English translation (six pages).

(Continued)

*Primary Examiner* — Todd E Manahan
*Assistant Examiner* — Rodolphe Andre Chabreyrie
(74) *Attorney, Agent, or Firm* — Crowell & Moring LLP (57) ABSTRACT

The invention provides a gas turbine combustor having structural reliability against vibration of fuel nozzles caused by fluid force and high environmental performance by uniform combustion in a combustion chamber. The gas turbine combustor comprises a fuel nozzle configured to inject fuel, and a fuel nozzle plate including a hole section into which an insertion section located in a root part of the fuel nozzle is inserted. The fuel nozzle includes a male screw section at least on an outer circumferential surface of a downstream portion viewed from a flowing direction of the fuel in the insertion section. The fuel nozzle plate includes a female screw section in the hole section. The female screw section screws with the male screw section. The fuel nozzle includes the insertion section. An upstream end portion of the insertion section is metallurgically joined to an upstream end portion of the fuel nozzle plate.

5 Claims, 4 Drawing Sheets

(52) U.S. Cl.
CPC .... *F05D 2240/35* (2013.01); *F05D 2250/131* (2013.01); *F23R 2900/00005* (2013.01)

(56) References Cited

U.S. PATENT DOCUMENTS

| | | | |
|---|---|---|---|
| 2004/0255422 A1 | 12/2004 | Reback et al. | |
| 2005/0000227 A1* | 1/2005 | McCaffrey | F23R 3/343 60/796 |
| 2009/0256007 A1* | 10/2009 | McMasters | F23R 3/28 239/463 |
| 2010/0044472 A1 | 2/2010 | Smith | |
| 2010/0071377 A1* | 3/2010 | Fox | F23R 3/16 60/740 |
| 2011/0252803 A1 | 10/2011 | Subramanian et al. | |
| 2012/0192568 A1* | 8/2012 | Miura | F23R 3/343 60/776 |
| 2013/0318975 A1* | 12/2013 | Stoia | F23R 3/283 60/737 |
| 2015/0000283 A1* | 1/2015 | Ramier | F23R 3/60 60/740 |
| 2015/0082770 A1* | 3/2015 | Igarashi | F23R 3/286 60/39.463 |
| 2015/0167470 A1* | 6/2015 | Duijnhouwer | F01D 5/026 416/170 R |
| 2016/0033136 A1 | 2/2016 | Kumagai et al. | |
| 2017/0176010 A1* | 6/2017 | Ryon | F02C 7/222 |

FOREIGN PATENT DOCUMENTS

| | | |
|---|---|---|
| EP | 2 980 483 A1 | 2/2016 |
| JP | 5-96728 U | 12/1993 |
| JP | 2009-14297 A | 1/2009 |
| JP | 2011-226773 A | 11/2011 |
| JP | 2016-35336 A | 3/2016 |

OTHER PUBLICATIONS

Extended European Search Report issued in counterpart European Application No. 17202608.0 dated Mar. 23, 2018 (six pages).
Indian Examination Report issued in counterpart Indian Application No. 201714040555 dated Aug. 8, 2019 (six (6) pages).
Korean-language Office Action issued in counterpart Korean Application No. 10-2017-0152989 dated Mar. 7, 2019 with English translation (10 pages).
Chinese-language Office Action issued in counterpart Chinese Application No. 201711159631.8 dated Dec. 18, 2019 with English translation (15 pages).
Chinese-language Office Action issued in counterpart Chinese Application No. 201711159631.8 dated Jun. 4, 2019 with English translation (16 pages).
Japanese-language Office Action issued in Japanese Application No. 2016-225591 dated Oct. 13, 2020 with English translation (five (5) pages).
Communication pursuant to Article 94(3) EPC issued in European Application No. 17202608.0 dated Apr. 14, 2021 (five (5) pages).

* cited by examiner

GAS TURBINE COMBUSTOR

CLAIM OF PRIORITY

The present application claims priority from Japanese Patent Application JP 2016-225591 filed on Nov. 21, 2016, the content of which is hereby incorporated by reference into this application.

FIELD OF THE INVENTION

The present invention relates to a gas turbine combustor.

BACKGROUND OF THE INVENTION

In a gas turbine, for the purpose of reducing a load of exhaust gas on the environment, a strict environment standard is set for NOx emitted during driving. Since an emission amount of NOx increases according to a rise in flame temperature, in a combustor of the gas turbine (hereinafter referred to as "gas turbine combustor" or "combustor"), it is necessary to suppress formation of a locally high-temperature flame in a combustion chamber and achieve uniform combustion. In order to perform the uniform combustion in the combustion chamber, it is necessary to set, in the gas turbine combustor, a large number of fuel nozzles for injecting fuel and improve dispersiveness of the fuel.

JP 2009-014297 discloses an example of a gas turbine combustor including a plurality of fuel nozzles. In the gas turbine combustor, a parallel male screw is provided at the rear end portion (the upstream portion) of the fuel nozzle and a parallel female screw is provided on the inner circumference portion of a fuel nozzle setting hole of a fuel nozzle header. The fuel nozzle is fixed to the fuel nozzle header by fastening the screws to each other.

In a gas turbine combustor, when the number of fuel nozzles is increased to improve dispersiveness of fuel injected from fuel nozzles, the distance between the fuel nozzles decreases and a space around the fuel nozzles is narrowed. In order to secure a space for joining the fuel nozzles to a fuel nozzle plate and a space between the fuel nozzles, which is a channel of the air, it is necessary to thin the fuel nozzles according to the increase in the number of fuel nozzles.

On the other hand, it is likely that vibration by fluid force occurs in the fuel nozzles set in a flowing place of compressed air. Vibrational stress that occurs in the fuel nozzles can be reduced by expanding the outer diameter of the fuel nozzles. However, when thin fuel nozzles are used to improve dispersiveness of fuel, it is difficult to reduce the vibrational stress and secure structural reliability against vibration. In order to improve the dispersiveness of the fuel of the fuel nozzles and secure the structural reliability against vibration, it is necessary to improve attenuation performance against the vibration of the fuel nozzles without expanding the outer diameter of the fuel nozzles.

SUMMARY OF THE INVENTION

An object of the present invention is to provide a gas turbine combustor having structural reliability against vibration of fuel nozzles caused by fluid force and high environmental performance by uniform combustion in a combustion chamber.

A gas turbine combustor of the present invention comprises a fuel nozzle configured to inject fuel, and a fuel nozzle plate including a hole section into which an insertion section located in a root part of the fuel nozzle is inserted. The fuel nozzle includes a male screw section at least on an outer circumferential surface of a downstream portion viewed from a flowing direction of the fuel in the insertion section. The fuel nozzle plate includes a female screw section in the hole section. The female screw section screws with the male screw section. The fuel nozzle includes the insertion section. An upstream end portion of the insertion section is metallurgically joined to an upstream end portion of the fuel nozzle plate.

According to the present invention, a gas turbine combustor is provided which has structural reliability against vibration of fuel nozzles caused by fluid force and high environmental performance by uniform combustion in a combustion chamber.

DETAILED DESCRIPTION OF THE INVENTION

Gas turbine combustors according to embodiments of the present invention are described below with reference to the drawings. Note that the same components are denoted by the same reference characters in the drawings and in this specification and repeated explanation of the components is sometimes omitted.

Figure 1:
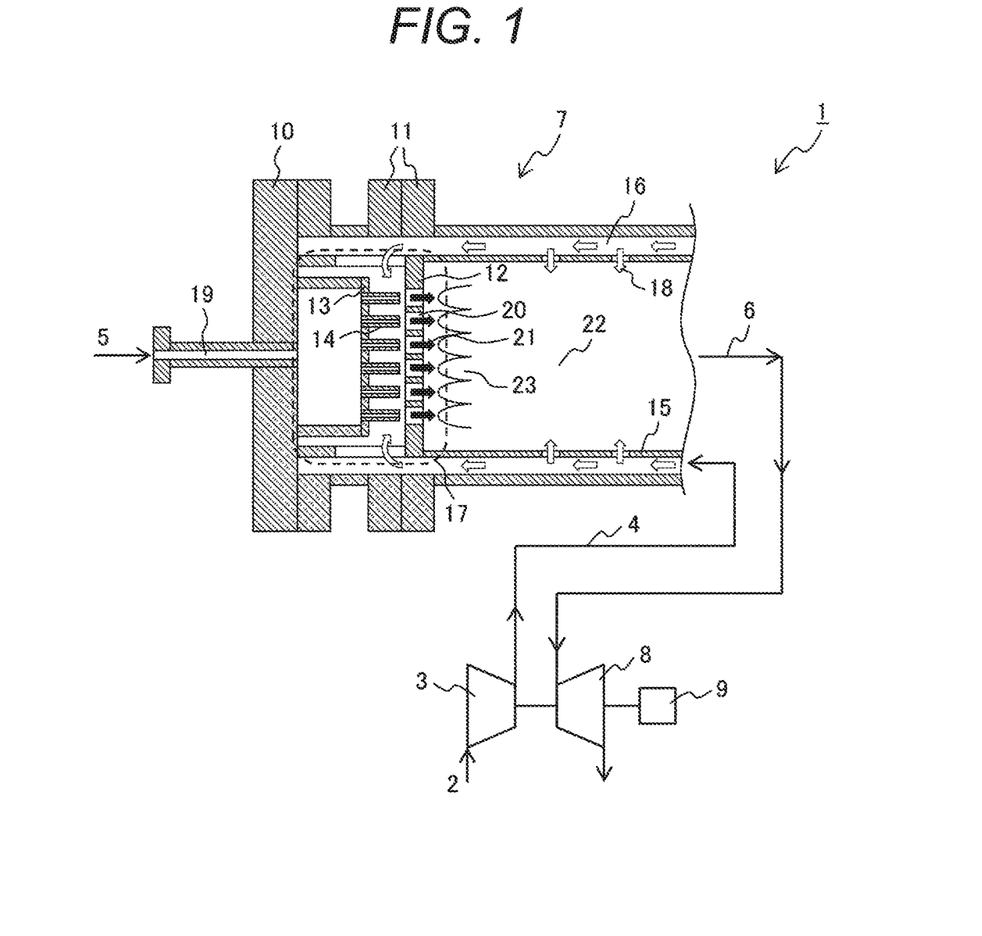
FIG. 1 is a diagram showing an example of the configuration of a gas turbine plant including a gas turbine combustor according to an embodiment of the present invention.

With reference to FIG. 1, a configuration example of a gas turbine plant including a gas turbine combustor according to an embodiment of the present invention is described. FIG. 1 is a diagram showing an example of the configuration of a gas turbine plant including a gas turbine combustor according to an embodiment of the present invention. A combustor 7 is shown in a sectional view in FIG. 1.

A gas turbine plant 1 includes a compressor 3, a combustor 7, a gas turbine 8, and a generator 9. The compressor 3 takes in air 2 from the atmosphere and compresses the air 2. The combustor 7 burns compressed air 4 generated by the compressor 3 and fuel 5 and generates a high-temperature and high-pressure combustion gas 6. The gas turbine 8 is driven by the combustion gas 6 generated by the combustor 7 and extracts energy of the combustion gas 6 as rotation power. The generator 9 generates electric power using the rotation power of the gas turbine 8.

The combustor 7 includes an end flange 10, an outer cylinder 11, a burner 17, a liner 15, and a combustion chamber 22. The burner 17 includes a perforated plate 12, a fuel nozzle plate 13, and a plurality of fuel nozzles 14.

The compressed air 4 generated by the compressor 3 passes a channel 16 between the outer cylinder 11 and the liner 15 and flows into the burner 17. A part of the compressed air 4 flows into the liner 15 as cooling air 18 for cooling the liner 15.

The fuel 5 passes a fuel supply pipe 19 of the end flange 10, flows into the fuel nozzle plate 13, and flows in fuel channels of the fuel nozzles 14 to be injected to the perforated plate 12 from the fuel nozzles 14. In inlets on the fuel nozzle 14 side of air holes 20 of the perforated plate 12, the fuel 5 injected from the fuel nozzles 14 and the compressed air 4 flowing into the burner 17 are mixed. An air fuel mixture 21 of the fuel 5 and the compressed air 4 is injected toward the combustion chamber 22 to form a flame 23. As the fuel 5, not only natural gas but also other gases, such as coke oven gas, refinery-off gas, and coal-gasified gas, can be used.

In the following description, "upstream" and "downstream" mean directions defined by the flow of the fuel 5. In FIG. 1, the left side is upstream and the right side is downstream.

Figure 2:
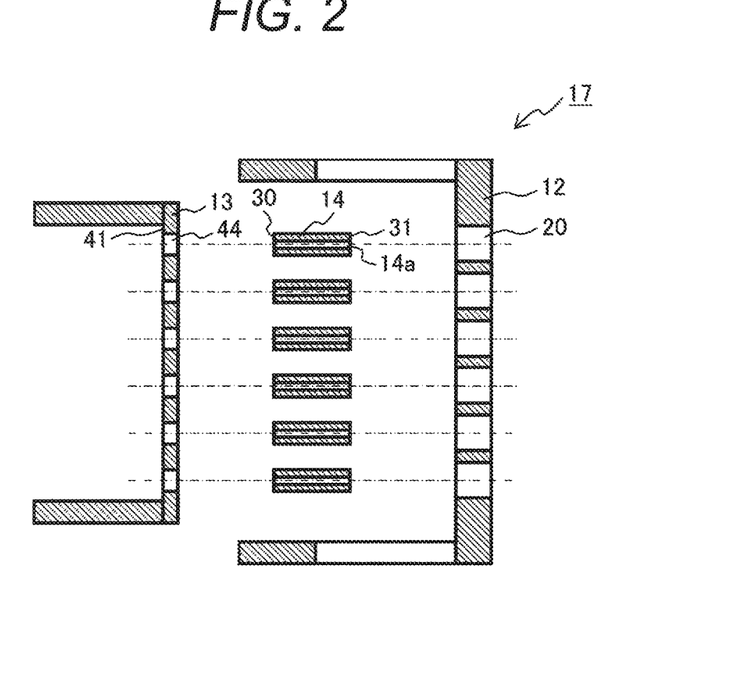
FIG. 2 is an exploded view showing components of a burner.

FIG. 2 is an exploded view showing components of the burner 17. The burner 17 is shown in a sectional view in FIG. 2. The burner 17 includes the perforated plate 12, the fuel nozzle plate 13, and the plurality of fuel nozzles 14.

The fuel nozzle 14 includes a fuel channel 14a inside the fuel nozzle 14, in which the fuel 5 flows. The fuel nozzle 14 is supported by the fuel nozzle plate 13 so as to extend from the upstream side to the downstream side. The fuel nozzle 14 injects the fuel 5 to the downstream side, which is supplied from the upstream side.

The fuel nozzle plate 13 includes a fuel nozzle attachment hole 44 which is a hole section. The fuel nozzle 14 is set in the fuel nozzle attachment hole 44. The fuel nozzle plate 13 supports the fuel nozzle 14 and supplies the fuel 5 to the fuel nozzle 14, which flows in from the upstream side.

An upstream end portion 30 of the fuel nozzle 14 is metallurgically joined to an upstream end portion 41 of the fuel nozzle plate 13. A joining section of the upstream end portion 30 and the upstream end portion 41 is sealed such that the fuel 5 does not leak. A downstream end portion 31 of the fuel nozzle 14 is not in contact with the air hole 20 of the perforated plate 12 so that the compressed air 4 can freely flow into the air hole 20. The upstream end portion 30 of the fuel nozzle 14 and the upstream end portion 41 of the fuel nozzle plate 13 are joined to each other by welding, brazing, or the like. In the following description, an example is described in which the upstream end portion 30 of the fuel nozzle 14 and the upstream end portion 41 of the fuel nozzle plate 13 are joined to each other by welding.

A configuration of a burner, in particular, a configuration in which a fuel nozzle is fixed to a fuel nozzle plate is described for a conventional gas turbine combustor.

Figure 3:
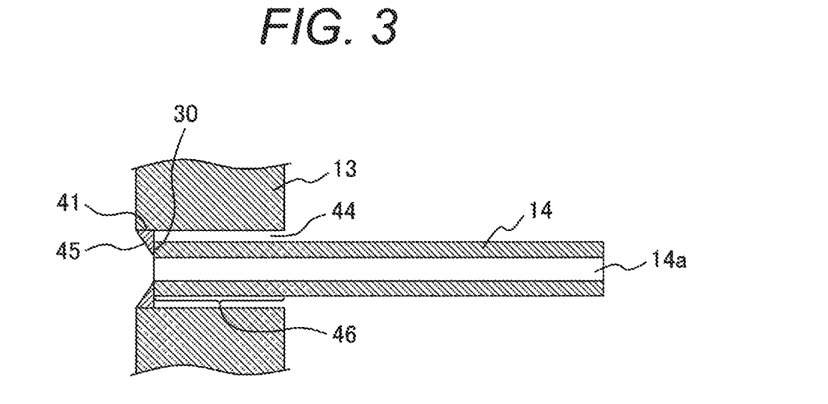
FIG. 3 is a sectional view of a fuel nozzle and a fuel nozzle plate, showing a configuration in which the fuel nozzle is fixed to the fuel nozzle plate in a burner in a conventional gas turbine combustor.

FIG. 3 is a diagram showing a configuration in which the fuel nozzle 14 is fixed to the fuel nozzle plate 13 in the burner in a conventional gas turbine combustor and is a sectional view of the fuel nozzle 14 and the fuel nozzle plate 13.

In the conventional gas turbine combustor, the upstream end portion 30 of the fuel nozzle 14 is joined to the upstream end portion 41 of the fuel nozzle plate 13 by welding. The fuel nozzle 14 is fixed to the fuel nozzle plate 13 by this welding. A portion where the upstream end portion 30 of the fuel nozzle 14 and the upstream end portion 41 of the fuel nozzle plate 13 are joined is referred to as "joining section 45". A portion where the fuel nozzle 14 is supported by the fuel nozzle plate 13, that is, a portion located in a root part of the fuel nozzle 14 and lying in the fuel nozzle attachment hole 44 is referred to as "insertion section 46". The outer circumferential surface of the insertion section 46 of the fuel nozzle 14 and the wall surface of the fuel nozzle attachment hole 44 of the fuel nozzle plate 13 are in contact to reduce a load acting on the joining section 45 (vibrational stress acting on the joining section 45). A frictional force occurs according to the contact of the outer circumferential surface of the insertion section 46 of the fuel nozzle 14 and the wall surface of the fuel nozzle attachment hole 44 of the fuel nozzle plate 13. Vibration of the fuel nozzle 14 is attenuated by the frictional force.

However, because the conventional gas turbine combustor includes a gap between the outer circumferential surface of the insertion section 46 of the fuel nozzle 14 and the wall surface of the fuel nozzle attachment hole 44 of the fuel nozzle plate 13, the contact of the outer circumferential surface of the insertion section 46 of the fuel nozzle 14 and the wall surface of the fuel nozzle attachment hole 44 of the fuel nozzle plate 13 sometimes cannot be sufficiently obtained. Therefore, the effect of the attenuation of the vibration of the fuel nozzle 14 is not sufficient in the conventional gas turbine combustor.

In a gas turbine combustor according to embodiments of the present invention, the fuel nozzle 14 includes a screw section (a portion having a thread ridge) at least on the outer circumferential surface of a downstream portion of the insertion section 46 and has a configuration in which the upstream end portion 30 of the insertion section 46 is metallurgically joined to the fuel nozzle plate 13. The downstream portion of the insertion section 46 of the fuel nozzle 14 is a portion including the downstream end portion of the insertion section 46 of the fuel nozzle 14. The screw section provided at least on the outer circumferential surface of the downstream portion of the insertion section 46 of the fuel nozzle 14 screws with a screw section provided on the wall surface of the fuel nozzle attachment hole 44 of the fuel nozzle plate 13. Vibration of the fuel nozzle 14 can be attenuated by frictional force caused by the contact of the screw sections. In a gas turbine combustor according to embodiments of the present invention, at least the downstream portion of the insertion section 46 of the fuel nozzle 14 screws with the fuel nozzle plate 13. Therefore, it is possible to further increase the frictional force caused by the contact of the fuel nozzle 14 and the fuel nozzle plate 13 than in the conventional gas turbine combustor shown in FIG. 3. It is therefore possible to improve attenuation performance against the vibration of the fuel nozzle 14.

In a gas turbine combustor according to embodiments of the present invention, with such a configuration, the fuel nozzle 14 is mainly supported by the fuel nozzle plate 13 in the screw section of the insertion section 46. It is possible to improve the attenuation performance against the vibration of the fuel nozzle 14. It is possible to secure high structural reliability against the vibration of the fuel nozzle 14. In a gas turbine combustor according to embodiments of the present invention, it is possible to secure high structural reliability without expanding the outer diameter of the fuel nozzle 14. Therefore, it is possible to increase the number of fuel nozzles 14 to achieve uniform combustion in the combustion chamber 22 and obtain high environmental performance.

First Embodiment

Figure 4:
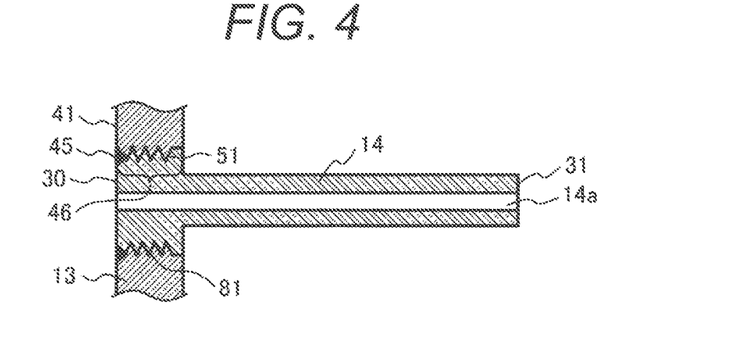
FIG. 4 is a sectional view of a fuel nozzle and a fuel nozzle plate, showing a configuration in which the fuel nozzle is fixed to the fuel nozzle plate in a burner in a gas turbine combustor according to the first embodiment of the present invention.

FIG. 4 is a diagram showing a configuration in which the fuel nozzle 14 is fixed to the fuel nozzle plate 13 in a burner in a gas turbine combustor according to the first embodiment of the present invention and is a sectional view of the fuel nozzle 14 and the fuel nozzle plate 13.

The fuel nozzle 14 includes a screw section (a male screw section) 51 on the entire outer circumferential surface of the insertion section 46. The fuel nozzle plate 13 includes the fuel nozzle attachment hole 44 which is a hole section into which the insertion section 46 located in the root part of the fuel nozzle 14 is inserted, and includes a screw section (a female screw section) 81 in a portion that supports the fuel nozzle 14 (a position corresponding to the screw section 51 of the fuel nozzle 14) on the wall surface of the fuel nozzle attachment hole 44. The screw section (the male screw section) 51 of the fuel nozzle 14 screws with the screw section (the female screw section) 81 of the fuel nozzle plate 13.

Further, the upstream end portion 30 of the insertion section 46 of the fuel nozzle 14 is metallurgically joined to the upstream end portion 41 of the fuel nozzle plate 13. The joining section 45, where the fuel nozzle 14 and the fuel nozzle plate 13 are metallurgically joined together, plays a role of a seal between the fuel nozzle 14 and the fuel nozzle plate 13 and a rotation stopper for the fuel nozzle 14.

Figure 5:
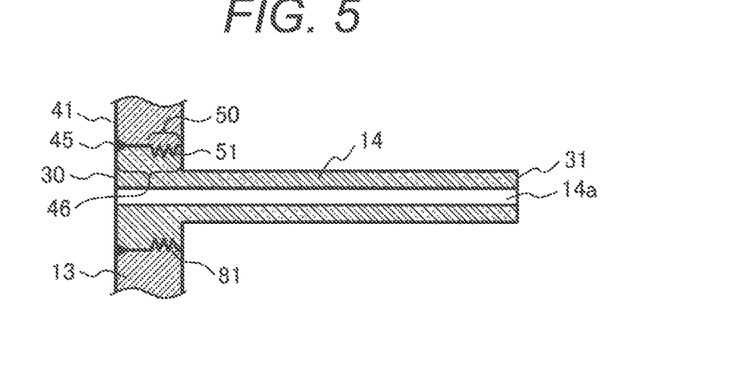
FIG. 5 is a sectional view of the fuel nozzle and the fuel nozzle plate, showing a modification of the configuration in which the fuel nozzle is fixed to the fuel nozzle plate shown in FIG. 4.

FIG. 5 is a sectional view of the fuel nozzle 14 and the fuel nozzle plate 13, showing a modification of the configuration shown in FIG. 4 in which the fuel nozzle plate 13 and the fuel nozzle 14 are fixed to each other.

In the configuration shown in FIG. 5, the fuel nozzle 14 includes the screw section (the male screw section) 51 only on the outer circumferential surface of a downstream portion 50 of the insertion section 46. The fuel nozzle plate 13 includes the screw section (the female screw section) 81 in a position corresponding to the screw section 51 of the fuel nozzle 14 on the wall surface of the fuel nozzle attachment hole 44. The screw section (the male screw section) 51 of the fuel nozzle 14 is screwed with the screw section (the female screw section) 81 of the fuel nozzle plate 13. The upstream end portion 30 of the insertion section 46 of the fuel nozzle 14 is metallurgically joined to the upstream end portion 41 of the fuel nozzle plate 13 in the joining section 45.

In the configurations shown in FIG. 4 and FIG. 5, the fuel nozzle 14 is structurally supported with respect to the fuel nozzle plate 13 mainly by the screw section 51. The fuel nozzle 14 includes the screw section 51 at least on the outer circumferential surface of the downstream portion 50 of the insertion section 46. The fuel nozzle plate 13 includes the screw section 81 on the wall surface of the fuel nozzle attachment hole 44. Therefore, even if the fuel nozzle 14 vibrates due to fluid force or the like, it is possible to obtain high attenuation performance against the vibration of the fuel nozzle 14 by friction of the screw section 51 and the screw section 81. Further, since the fuel nozzle 14 is supported by the fuel nozzle plate 13, mainly by the screw section 51, it is possible to reduce load (vibrational stress) acting on the joining section 45 present on the upstream side of the insertion section 46. In the gas turbine combustor according to this embodiment, it is possible to improve structural reliability with such a configuration.

When the fuel nozzle 14 vibrates due to fluid force or the like, vibration amplitude of the downstream end portion 31, which is the distal end of a portion projecting from the fuel nozzle plate 13, is the largest in the fuel nozzle 14. In the gas turbine combustor according to this embodiment, the fuel nozzle 14 is metallurgically joined to the fuel nozzle plate 13 in the joining section 45 at the upstream end portion 30. The vibration is attenuated by friction between the fuel nozzle 14 and the fuel nozzle plate 13 in the screw section 51 between the joining section 45 and the downstream end portion 31. The fuel nozzle 14 is joined to the fuel nozzle plate 13 in a position (the upstream end portion 30) most distant from the downstream end portion 31 where the vibration amplitude is the largest. Therefore, it is possible to further increase the friction between the fuel nozzle plate 13 and the screw section 51 present between the joining section 45 and the downstream end portion 31, and it is possible to further increase a vibration attenuation effect by this friction.

When the screw section 51 is provided in the entire insertion section 46 of the fuel nozzle 14 as shown in FIG. 4, it is possible to increase the vibration attenuation effect of the fuel nozzle 14. However, in this configuration, because the upstream end portion of the screw section 51 of the fuel nozzle 14 is metallurgically joined to the fuel nozzle plate 13, metallurgical joining (welding or brazing) is difficult at this position. This brings about a concern about deterioration in the quality of joining such as deterioration in joining strength and flatness of a joining surface. In such a case, it is possible to adopt a configuration in which the fuel nozzle 14 includes the screw section 51 only in the downstream portion 50 of the insertion section 46 as shown in FIG. 5. Note that the length of the presence of the screw section 51 (the length in a flowing direction of the fuel 5, that is, the length in the axial direction of the fuel nozzle 14) is desirably 20% or more of the length of a portion of the fuel nozzle 14 projecting from the fuel nozzle plate 13 (the distance between the fuel nozzle plate 13 and the downstream end portion 31 of the fuel nozzle 14). When the screw section 51 has such length, it is considered possible to effectively attenuate the vibration of the fuel nozzle 14.

In the configurations shown in FIG. 4 and FIG. 5, in the fuel nozzle 14, the outer diameter of the insertion section 46 is larger than the outer diameter of the portion projecting from the fuel nozzle plate 13. Note that, in the fuel nozzle 14, the outer diameter of the insertion section 46 and the outer diameter of the portion projecting from the fuel nozzle plate 13 may be the same.

Second Embodiment

Figure 6:
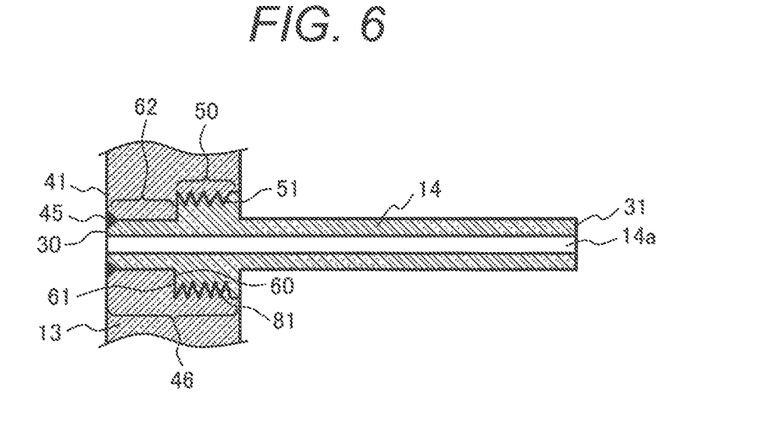
FIG. 6 is a sectional view of a fuel nozzle and a fuel nozzle plate, showing a configuration in which the fuel nozzle is fixed to the fuel nozzle plate in a burner in a gas turbine combustor according to the second embodiment of the present invention.

FIG. 6 is a diagram showing a configuration in which the fuel nozzle 14 is fixed to the fuel nozzle plate 13 in a burner in a gas turbine combustor according to the second embodiment of the present invention and is a sectional view of the fuel nozzle 14 and the fuel nozzle plate 13.

In the fuel nozzle 14, the insertion section 46 includes the downstream portion 50 and an upstream portion 62. The upstream portion 62 of the insertion section 46 of the fuel nozzle 14 is a portion including the upstream end portion 30 of the insertion section 46 of the fuel nozzle 14. The fuel nozzle 14 includes the screw section (the male screw section) 51 only on the outer circumferential surface of the downstream portion 50 of the insertion section 46. A root diameter of the screw section 51 (a diameter in a portion of a groove of the screw section 51) is larger than the outer diameter of the upstream portion 62 of the insertion section 46. The fuel nozzle 14 does not include the screw section 51 on the outer circumferential surface of the upstream portion 62. The fuel nozzle plate 13 includes the fuel nozzle attachment hole 44 having a shape corresponding to the fuel nozzle 14. The wall surface of the fuel nozzle attachment hole 44 includes the screw section (the female screw section) 81 in a position corresponding to the screw section 51 of the fuel nozzle 14.

The fuel nozzle 14 includes a step section 60 that connects the downstream portion 50 and the upstream portion 62 of the insertion section 46. The fuel nozzle plate 13 includes a step section 61 on the wall surface of the fuel nozzle attachment hole 44. The step section 61 has a shape corresponding to the step section 60 of the fuel nozzle 14. The step section 60 of the fuel nozzle 14 and the step section 61 of the fuel nozzle plate 13 are in contact with each other. The step section 60 of the fuel nozzle 14 and the step section 61 of the fuel nozzle plate 13 are surfaces desirably perpendicular to the axial direction (the length direction) of the fuel nozzle 14.

The screw section (the male screw section) 51 of the fuel nozzle 14 is screwed with the screw section (the female screw section) 81 of the fuel nozzle plate 13. The upstream end portion 30 of the insertion section 46 of the fuel nozzle 14 is metallurgically joined to the upstream end portion 41 of the fuel nozzle plate 13 in the joining section 45.

The gas turbine combustor according to this embodiment has a structure that the fuel nozzle 14 is screwed into the fuel nozzle plate 13 from the downstream side when the burner 17 is assembled. In addition to the effects described in the first embodiment, the gas turbine combustor according to this embodiment has an effect that it is easy to position the fuel nozzle 14 in the axial direction (the length direction) by setting the step section 60 of the fuel nozzle 14 and the step section 61 of the fuel nozzle plate 13 in contact with each other when the burner 17 is assembled. Therefore, in the gas turbine combustor according to this embodiment, it is possible to accurately assemble the burner 17 and obtain high structural reliability against the vibration of the fuel nozzle 14.

Third Embodiment

Figure 7A:
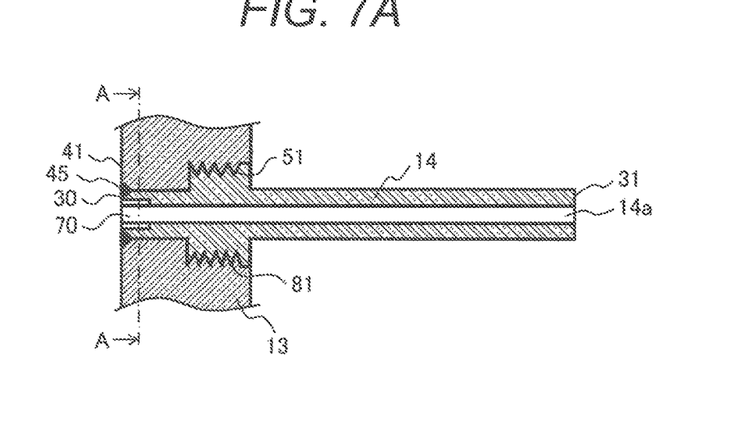
FIG. 7A is a sectional view of a fuel nozzle and a fuel nozzle plate, showing a configuration in which the fuel nozzle is fixed to the fuel nozzle plate in a burner in a gas turbine combustor according to the third embodiment of the present invention.
Figure 7B:
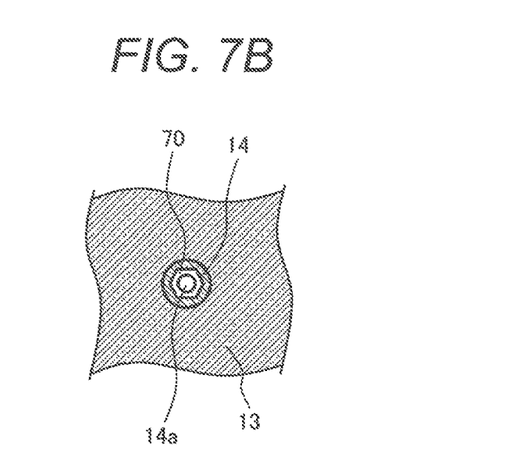
FIG. 7B is a sectional view of the fuel nozzle and the fuel nozzle plate taken along a cutting plane line A-A shown in FIG. 7A.

FIG. 7A is a diagram showing a configuration in which the fuel nozzle 14 is fixed to the fuel nozzle plate 13 in a burner in a gas turbine combustor according to the third embodiment of the present invention and is a sectional view of the fuel nozzle 14 and the fuel nozzle plate 13. FIG. 7B is a sectional view of the fuel nozzle 14 and the fuel nozzle plate 13 taken along a cutting plane line A-A shown in FIG. 7A.

The burner 17 of the gas turbine combustor according to this embodiment includes the following configuration in addition to the configuration of the burner 17 of the gas turbine combustor according to the second embodiment. That is, the fuel nozzle 14 has a polygonal cross section at the upstream end portion 70 of the fuel channel 14a, and the cross section is perpendicular to the fuel channel 14a.

When the burner 17 is assembled, the fuel nozzle 14 is inserted into the fuel nozzle attachment hole 44 of the fuel nozzle plate 13 from the downstream side. The fuel nozzle 14 is rotated such that the screw section (the male screw section) 51 of the fuel nozzle 14 screws with the screw section (the female screw section) 81 of the fuel nozzle plate 13. Work for rotating the fuel nozzle 14 is sometimes performed by inserting a tool (e.g., a wrench) into the fuel channel 14a from the upstream end portion 70 of the fuel channel 14a. Therefore, in the upstream end portion 70 of the fuel channel 14a of the fuel nozzle 14, the cross section perpendicular to the fuel channel 14a has a polygonal shape such that a tool can be inserted into the fuel channel 14a from the upstream end portion 70 to rotate the fuel nozzle 14.

The shape of the cross section of the upstream end portion 70 of the fuel channel 14a can be decided according to the shape of a tool used for the assembly of the burner 17. FIG. 7A and FIG. 7B show an example in which the shape of the cross section of the upstream end portion 70 of the fuel channel 14a is a hexagon. In the example shown in FIG. 7A and FIG. 7B, it is possible to screw the fuel nozzle 14 into the fuel nozzle plate 13 using a hexagonal wrench key (hex key).

In the gas turbine combustor according to this embodiment, the upstream end portion 70 of the fuel channel 14a of the fuel nozzle 14 has a shape corresponding to the shape of a tool used for the assembly of the burner 17. Therefore, it is possible to surely assemble the burner 17 and obtain high structural reliability against the vibration of the fuel nozzle 14.

Note that, like the gas turbine combustor according to this embodiment, the gas turbine combustor according to the first embodiment (FIGS. 4 and 5) also can have a configuration in which the upstream end portion 70 of the fuel channel 14a of the fuel nozzle 14 has a polygonal-shaped cross section perpendicular to the fuel channel 14a.

Fourth Embodiment

Figure 8:
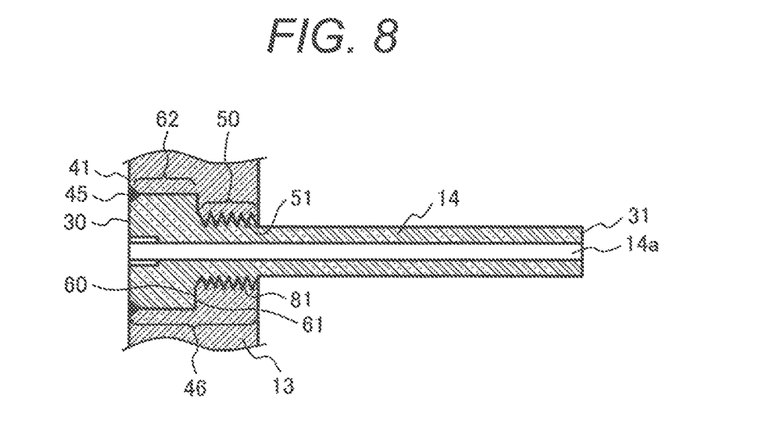
FIG. 8 is a sectional view of a fuel nozzle and a fuel nozzle plate, showing a configuration in which the fuel nozzle is fixed to the fuel nozzle plate in a burner in a gas turbine combustor according to the fourth embodiment of the present invention.

FIG. 8 is a diagram showing a configuration in which the fuel nozzle 14 is fixed to the fuel nozzle plate 13 in a burner in a gas turbine combustor according to the fourth embodiment of the present invention and is a sectional view of the fuel nozzle 14 and the fuel nozzle plate 13.

In the fuel nozzle 14, the insertion section 46 includes the downstream portion 50 and the upstream portion 62. The fuel nozzle 14 includes the screw section (the male screw section) 51 only on the outer circumferential surface of the downstream portion 50 of the insertion section 46. A ridge diameter of the screw section 51 (a diameter in a portion of a ridge of the screw section 51) is smaller than the outer diameter of the upstream portion 62 of the insertion section 46. The fuel nozzle 14 does not include the screw section 51 on the outer circumferential surface of the upstream portion 62. The fuel nozzle plate 13 includes the fuel nozzle attachment hole 44 having a shape corresponding to the fuel nozzle 14. The wall surface of the fuel nozzle attachment hole 44 includes the screw section (the female screw section) 81 in a position corresponding to the screw section 51 of the fuel nozzle 14.

The fuel nozzle 14 includes the step section 60 that connects the downstream portion 50 and the upstream portion 62 of the insertion section 46. The fuel nozzle plate 13 includes the step section 61 on the wall surface of the fuel nozzle attachment hole 44. The step section 61 has a shape corresponding to the step section 60 of the fuel nozzle 14.

The step section 60 of the fuel nozzle 14 and the step section 61 of the fuel nozzle plate 13 are in contact with each other. The step section 60 of the fuel nozzle 14 and the step section 61 of the fuel nozzle plate 13 are surfaces desirably perpendicular to the axial direction (the length direction) of the fuel nozzle 14.

The screw section (the male screw section) 51 of the fuel nozzle 14 is screwed with the screw section (the female screw section) 81 of the fuel nozzle plate 13. The upstream end portion 30 of the insertion section 46 of the fuel nozzle 14 is metallurgically joined to the upstream end portion 41 of the fuel nozzle plate 13 in the joining section 45.

The gas turbine combustor according to this embodiment has a structure that the fuel nozzle 14 is screwed into the fuel nozzle plate 13 from the upstream side when the burner 17 is assembled. In addition to the effects described in the first embodiment, the gas turbine combustor according to this embodiment has an effect that it is easy to position the fuel nozzle 14 in the axial direction (the length direction) by setting the step section 60 of the fuel nozzle 14 and the step section 61 of the fuel nozzle plate 13 in contact with each other when the burner 17 is assembled. Further, even if damage occurs in the joining section 45 of the fuel nozzle 14 and the fuel nozzle plate 13, it is possible to prevent the fuel nozzle 14 from coming off the fuel nozzle plate 13 to the downstream side to damage other components of the combustor 7. Therefore, in the gas turbine combustor according to this embodiment, it is possible to accurately assemble the burner 17, prevent damage to the combustor 7, and obtain higher structural reliability against the vibration of the fuel nozzle 14.

Like the gas turbine combustor according to the third embodiment, the gas turbine combustor according to this embodiment also can have a configuration in which the upstream end portion 70 of the fuel channel 14a of the fuel nozzle 14 has a polygonal-shaped cross section perpendicular to the fuel channel 14a.

Note that the present invention is not limited to the embodiments described above. Various modifications of the embodiments are possible for the present invention. For example, the embodiments are described in detail to clearly describe the present invention. The present invention is not always limited to embodiments including all the components described above. A part of the components of one embodiment can be substituted with components of other embodiments. Components of other embodiments can also be added to the components of one embodiment. A part of the components of the embodiments can be deleted. Other components can be added to and substituted with a part of the components of the embodiments.

EXPLANATION OF REFERENCE CHARACTERS 1 gas turbine plant
2 air
3 compressor
4 compressed air
5 fuel
6 combustion gas
7 combustor
8 gas turbine
9 generator
10 end flange
11 outer cylinder
12 perforated plate
13 fuel nozzle plate
14 fuel nozzle
14a fuel channel of the fuel nozzle
15 liner
16 channel of the compressed air
17 burner
18 cooling air
19 fuel supply pipe
20 air hole
21 air fuel mixture
22 combustion chamber
23 flame
30 upstream end portion of the fuel nozzle
31 downstream end portion of the fuel nozzle
41 upstream end portion of the fuel nozzle plate
44 fuel nozzle attachment hole of the fuel nozzle plate
45 joining section
46 insertion section
50 downstream portion of the insertion section of the fuel nozzle
51 screw section (male screw section) of the fuel nozzle
60 step section of the fuel nozzle
61 step section of the fuel nozzle plate
62 upstream portion of the insertion section of the fuel nozzle
70 upstream end portion of the fuel channel of the fuel nozzle
81 screw section (female screw section) of the fuel nozzle plate

What is claimed is:

1. A gas turbine combustor comprising:
a plurality of fuel nozzles configured to inject fuel;
a fuel nozzle plate including a hole section into which an insertion section located in a root part of each of the fuel nozzles is inserted; and
a perforated plate facing a downstream end portion of each of the fuel nozzles in an axial direction of the fuel nozzles and including air holes that are not in contact with the downstream end portion of each of the fuel nozzles, the fuel nozzles being configured to inject the fuel into the air holes, the air holes mixing the fuel injected from the fuel nozzles and compressed air, and the perforated plate injecting an air fuel mixture of the fuel and the compressed air toward a combustion chamber, wherein
each of the fuel nozzles includes a male screw section at least on an outer circumferential surface of a downstream portion viewed from a flowing direction of the fuel in the insertion section,
the fuel nozzle plate includes a female screw section in the hole section, the female screw section screwing with the male screw section,
each of the fuel nozzles includes the insertion section, an upstream end portion of the insertion section being metallurgically joined to an upstream end portion of the fuel nozzle plate,
each of the fuel nozzles includes a fuel channel in which the fuel flows, the fuel channel being inside of the fuel nozzle, and
an upstream end portion of the fuel channel opens on an upstream side of the fuel nozzle plate.

2. The gas turbine combustor according to claim 1, wherein
each of the fuel nozzles includes the insertion section including the downstream portion and an upstream portion, each of the fuel nozzles includes the male screw section only on the outer circumferential surface of the downstream portion of the insertion section, and a root diameter of the male screw section is larger than an outer diameter of the upstream portion.

3. The gas turbine combustor according to claim 1, wherein each of the fuel nozzles includes the insertion section including the downstream portion and an upstream portion, each of the fuel nozzles includes the male screw section only on the outer circumferential surface of the downstream portion of the insertion section, and a ridge diameter of the male screw section is smaller than an outer diameter of the upstream portion.

4. The gas turbine combustor according to claim 2, wherein each of the fuel nozzles includes a step section configured to connect the downstream portion and the upstream portion of the insertion section, the fuel nozzle plate includes a step section on a wall surface of the hole section, the step section having a shape corresponding to the step section of each of the fuel nozzles, and the step section of each of the fuel nozzles and the step section of the fuel nozzle plate are in contact with each other.

5. The gas turbine combustor according to claim 1, wherein the fuel channel has a polygonal cross section at an upstream end portion of the fuel channel, the cross section perpendicular to the fuel channel.

\* \* \* \* \*